United States Patent
Buford et al.

(10) Patent No.: US 8,752,174 B2
(45) Date of Patent: Jun. 10, 2014

(54) SYSTEM AND METHOD FOR VOIP HONEYPOT FOR CONVERGED VOIP SERVICES

(75) Inventors: John F Buford, Princeton, NJ (US); Venkatesh Krishnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 700 days.

(21) Appl. No.: 12/978,858

(22) Filed: Dec. 27, 2010

(65) Prior Publication Data

US 2012/0167208 A1    Jun. 28, 2012

(51) Int. Cl.
*H04L 29/06* (2006.01)

(52) U.S. Cl.
USPC .................. 726/23; 726/13; 726/14; 726/22

(58) Field of Classification Search
None
See application file for complete search history.

(56) References Cited

U.S. PATENT DOCUMENTS

| | | | | |
|---|---|---|---|---|
| 7,440,558 B2* | 10/2008 | Heilmann et al. | ............ | 379/189 |
| 7,568,224 B1* | 7/2009 | Jennings et al. | ................ | 726/14 |
| 7,802,304 B2* | 9/2010 | Rao et al. | ......................... | 726/25 |
| 7,856,090 B1* | 12/2010 | Satish | ........................ | 379/93.01 |
| 8,141,152 B1* | 3/2012 | Hwang et al. | .................... | 726/22 |
| 8,161,540 B2* | 4/2012 | Mantripragada et al. | ........ | 726/13 |
| 2003/0219008 A1 | 11/2003 | Hrastar | | |
| 2004/0078592 A1 | 4/2004 | Fagone et al. | | |
| 2004/0128529 A1 | 7/2004 | Blake et al. | | |
| 2004/0128543 A1 | 7/2004 | Blake et al. | | |
| 2004/0234056 A1* | 11/2004 | Heilmann et al. | ............ | 379/196 |
| 2005/0166072 A1 | 7/2005 | Converse et al. | | |
| 2005/0210534 A1 | 9/2005 | Krishnamurthy | | |
| 2005/0259667 A1 | 11/2005 | Vinokurov et al. | | |
| 2006/0059554 A1 | 3/2006 | Akerman | | |
| 2006/0075099 A1 | 4/2006 | Pearson et al. | | |
| 2006/0101516 A1 | 5/2006 | Sudaharan et al. | | |
| 2006/0224677 A1 | 10/2006 | Ishikawa et al. | | |
| 2006/0256730 A1 | 11/2006 | Compton | | |
| 2007/0067841 A1 | 3/2007 | Yegneswaran et al. | | |
| 2007/0097976 A1 | 5/2007 | Wood et al. | | |
| 2007/0189194 A1 | 8/2007 | Hrastar | | |
| 2007/0209074 A1 | 9/2007 | Coffman | | |
| 2007/0209075 A1 | 9/2007 | Coffman | | |
| 2007/0214506 A1* | 9/2007 | Rao et al. | ........................ | 726/25 |
| 2007/0271614 A1 | 11/2007 | Capalik | | |
| 2008/0016570 A1 | 1/2008 | Capalik | | |

(Continued)

OTHER PUBLICATIONS

Carno R. et al., "Artemisa: an Open-Source Honeypot Back-End to Support Security in VoIP Domains", 2011 IFIP/IEEE International Symposium on Integrated Network Management (IM 2011), May 23-27, 2011. See p. 361 col. 2 line 16-p. 262 col. 1 line 4, p. 361 col. 1 lines 45-54, p. 362 col. 2 lines 30-42.

*Primary Examiner* — Michael R Vaughan

(57) ABSTRACT

Disclosed herein are systems, methods, and computer-readable storage media for a honeypot addressing cyber threats enabled by convergence of data and communication services in an enterprise network. Suspicious incoming VoIP calls from the Internet to the enterprise network are intercepted and directed to a VoIP honeypot that acts as a network decoy and responds automatically during call sessions for the suspicious incoming VOIP calls while tracing the suspicious incoming VOIP calls. Suspicious outgoing VoIP calls from the enterprise network to the Internet are also intercepted and directed to the VoIP honeypot. Moreover, an unsolicited VoIP call is redirected to the VoIP honeypot when the unsolicited VoIP call has been received by a user agent in the enterprise network and a human user of the user agent confirms that the unsolicited VoIP call was unsolicited.

18 Claims, 11 Drawing Sheets

(56) References Cited

U.S. PATENT DOCUMENTS

| | | |
|---|---|---|
| 2008/0018927 A1 | 1/2008 | Martin et al. |
| 2008/0046989 A1 | 2/2008 | Wahl |
| 2008/0104700 A1 | 5/2008 | Fagone et al. |
| 2008/0141374 A1 | 6/2008 | Sidiroglou et al. |
| 2008/0163354 A1* | 7/2008 | Ben-Shalom et al. .......... 726/12 |
| 2008/0209554 A1 | 8/2008 | Lee |
| 2008/0222729 A1 | 9/2008 | Chen et al. |
| 2008/0271151 A1 | 10/2008 | Blake et al. |
| 2008/0320594 A1 | 12/2008 | Jiang |
| 2009/0028135 A1* | 1/2009 | Mantripragada et al. ..... 370/352 |
| 2009/0103524 A1* | 4/2009 | Mantripragada et al. ..... 370/352 |
| 2009/0144823 A1 | 6/2009 | Lamastra et al. |
| 2009/0328213 A1 | 12/2009 | Blake et al. |
| 2009/0328216 A1 | 12/2009 | Rafalovich et al. |
| 2010/0067377 A1 | 3/2010 | Wang et al. |
| 2010/0118717 A1 | 5/2010 | Suzuki et al. |
| 2010/0329241 A1* | 12/2010 | Ryou et al. .................... 370/352 |

* cited by examiner

SYSTEM AND METHOD FOR VOIP HONEYPOT FOR CONVERGED VOIP SERVICES

BACKGROUND

1. Technical Field

The present disclosure relates generally to Voice Over Internet Protocol (VoIP) telephone services, and Intrusion Detection and Protection (IDP) services for VoIP telephone services in an enterprise network. The present disclosure relates specifically to a VoIP honeypot addressing cyber threats enabled by convergence of data and communication services in the enterprise network.

2. Introduction

Voice Over Internet Protocol (VoIP) telephone services have become very attractive for business enterprises that already have enterprise networks for storage and management of business documents and for Internet access. VoIP telephone service can be provided easily by plugging VoIP phones into the enterprise network, or by programming desktop computers to function as VoIP telephones. In addition, if it is desired for the VoIP phones to be configured as if they were in a private branch exchange (PBX), this can be done by suitable programming of a gateway server in the enterprise network.

VoIP phones also have the advantage that they may use data services of the Internet to supplement the communication service used for setting up and conducting a VoIP call session. For example, VoIP service is divided into Session Initiation Protocol (SIP) related communication service and H.323 related data service. In addition, multimedia data service for VoIP is under development. H.323 related data service includes homepage service, Internet yellow page and collect call service, search phone service, and phone number searching function. The SIP communication service and H.323 related data service may also be integrated with web services such as instant message (IM) service, personal data assistant (PDA) service, and mobile phone service.

VoIP service carried over the Internet is subject to conventional IP network cyber attacks, such as scanning, reconnaissance, intrusion, man-in-middle, re-direction, and denial of service (DOS). In addition, VoIP attacks include Spam over Internet Telephony (SPIT)), surveillance of calls and messaging, retrieval of voice mail, and toll fraud on other users' accounts. There are VoIP-specific vulnerabilities in protocols and implementations of SIP, the Session Data Protocol (SDP), media and codecs, and so on. The VoIP infrastructure is distributed and difficult to secure.

An enterprise network can be protected from incoming cyber attack by Intrusion Detection and Protection (IDP) software installed in the gateway connecting the enterprise network to the Internet. Such IDP software may block a majority of the cyber attacks upon the enterprise network.

For large enterprises or enterprises having enticing targets, it is advantageous to provide a mechanism for observing and characterizing cyber attacks. This can be done by using a network security tool known as a "honeypot." The honeypot deliberately provides the vulnerabilities sought by the attackers in order to observe the attacks and intrusions. The honeypot acts as a network decoy to contain attackers, impede attackers, and trace their activities.

There are two types of honeypots in practice, referred to as low-interaction and high-interaction. A low-interaction honeypot appears as a network of hosts running any kind of service. The low-interaction honeypot has a database of protocol signatures for the specified services for different operating systems (OS) and OS versions. The low-interaction honeypot replies to incoming traffic using the appropriate signature. The application state of the low-interaction honeypot is limited, and is pre-stored or generated dynamically from scripts.

A high-interaction honeypot is more realistic than a low-interaction honeypot. A high-interaction honeypot is more likely to avoid detection by an attacker, but the high-interaction honeypot requires more effort to set up. A high-interaction honeypot ranges from a few real servers working together with a low-interaction honeypot, to a copy of an actual production network, suitably scrubbed. Increased realism in the honeypot behavior generally enhances the value of the honeypot, because network attackers spend more time in meaningless reconnaissance.

A VoIP honeypot is an existing variation of honeypot that impersonates VoIP infrastructure for VoIP attacks. Existing VoIP honeypots detect signaling anomalies at SIP protocol level and divert to a separate PBX, which is configured as the decoy. See, for example, Nassar et al., VoIP Honeypot Architecture, in Integrated Network Management, 2007, pp. 109-118, IEEE, New York, N.Y.

In the example of Nassar et al., the honeypot registers its IP address with a number of SIP Uniform Resource Identifiers (URIs) at a registrar server in a PBX router or SIP proxy, registrar, or redirect server providing security services and a user provisioning web interface. The SIP URIs of the honeypot may be declared to the outside world as users of the domain, but because they do not represent real users they should theoretically never be called. To deceive the attacker, each SIP URI of the honeypot is configured to adopt one user agent type and send its name in the User-Agent header.

In the example of Nassar et al., the honey pot itself includes five main components. These components are (1) a honey-pot agent responsible for accepting incoming calls and investigating possible attacks, (2) protocol stacks for SIP, SDP, and the Real-time Transfer Protocol (RTP), (3) a honeypot profiles database of configuration files, (4) reconnaissance tools, and (5) an inference engine able to interpret automatically the results of investigations by means of special metrics and a Bayes mode. The honeypot also has a graphical user interface to allow the system administrator to choose and setup a honeypot profile, as well as visualize traces, alerts, and statistics.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for using a VoIP honeypot to address cyber threats enabled by convergence of data and communication services in the enterprise network.

In accordance with one aspect, the disclosure provides a method of addressing cyber threats enabled by convergence of data and communications services in an enterprise network. The method includes a data processor executing computer instructions stored on a non-transitory computer readable storage medium to perform the steps of: (a) intercepting suspicious incoming VoIP calls from the Internet to the enterprise network, and directing the suspicious incoming VOIP calls to a VoIP honeypot that acts as a network decoy and responds automatically during call sessions for the suspicious incoming VOIP calls while tracing the suspicious incoming VOIP calls; and (b) intercepting suspicious outgoing VoIP calls from the enterprise network to the Internet, and directing the suspicious outgoing VOIP calls to the VoIP honeypot that acts as a network decoy that responds automatically during call sessions for the suspicious outgoing VOIP calls while tracing the suspicious outgoing VOIP calls.

In accordance with another aspect, the disclosure provides a system for addressing cyber threats enabled by convergence of data and communications services in an enterprise network. The system includes a network computer including a data processor and a non-transitory computer-readable storage medium. The non-transitory computer-readable storage medium stores computer instructions that, when executed by the data processor, perform the steps of: (a) intercepting suspicious incoming VoIP calls from the Internet to the enterprise network, and directing the suspicious incoming VOIP calls to a VoIP honeypot that acts as a network decoy and responds automatically during call sessions for the suspicious incoming VOIP calls while tracing the suspicious incoming VOIP calls; and (b) intercepting suspicious outgoing VoIP calls from the enterprise network to the Internet, and directing the suspicious outgoing VOIP calls to the VoIP honeypot that acts as a network decoy that responds automatically during call sessions for the suspicious outgoing VOIP calls while tracing the suspicious outgoing VOIP calls.

In accordance with a final aspect, the disclosure provides a non-transitory computer-readable storage medium storing computer instructions that, when executed by a data processor, perform a method of addressing cyber threats enabled by convergence of data and communications services in an enterprise network by the steps of: (a) intercepting suspicious incoming VoIP calls from the Internet to the enterprise network, and directing the suspicious incoming VOIP calls to a VoIP honeypot that acts as a network decoy and responds automatically during call sessions for the suspicious incoming VOIP calls while tracing the suspicious incoming VOIP calls; and (b) intercepting suspicious outgoing VoIP calls from the enterprise network to the Internet, and directing the suspicious outgoing VOIP calls to the VoIP honeypot that acts as a network decoy that responds automatically during call sessions for the suspicious outgoing VOIP calls while tracing the suspicious outgoing VOIP calls.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

The present disclosure addresses the need in the art for improved methods to address cyber threats enabled by convergence of data and communication services in an enterprise network. First there will be a discussion of a basic general purpose computing device in FIG. 1 and then an example network configuration in FIG. 2 which can be employed to practice the concepts disclosed herein. Then there will follow a more detailed description of a system in FIG. 3 and methods for addressing cyber threats enabled by convergence of data and communication services in an enterprise network of the system in FIG. 3.

Figure 1:
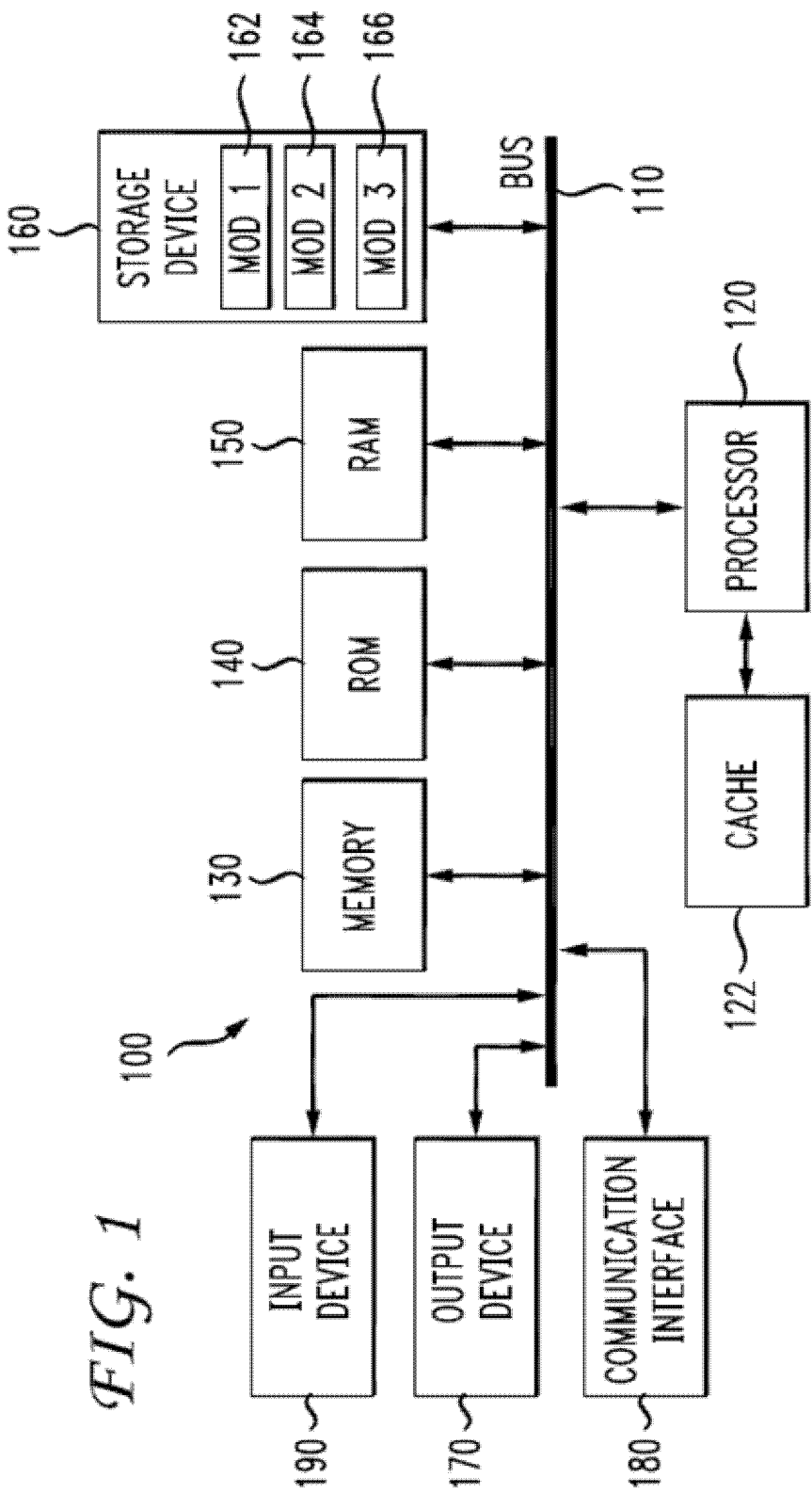
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics.

It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules (Mod1 162, Mod2 164 and Mod3 166), which are modules configured to control the processor 120. These modules may be stored on the storage device 160 and loaded into RAM 150 or memory 130 at runtime or may be stored as would be known in the art in other computer-readable memory locations.

Figure 2:
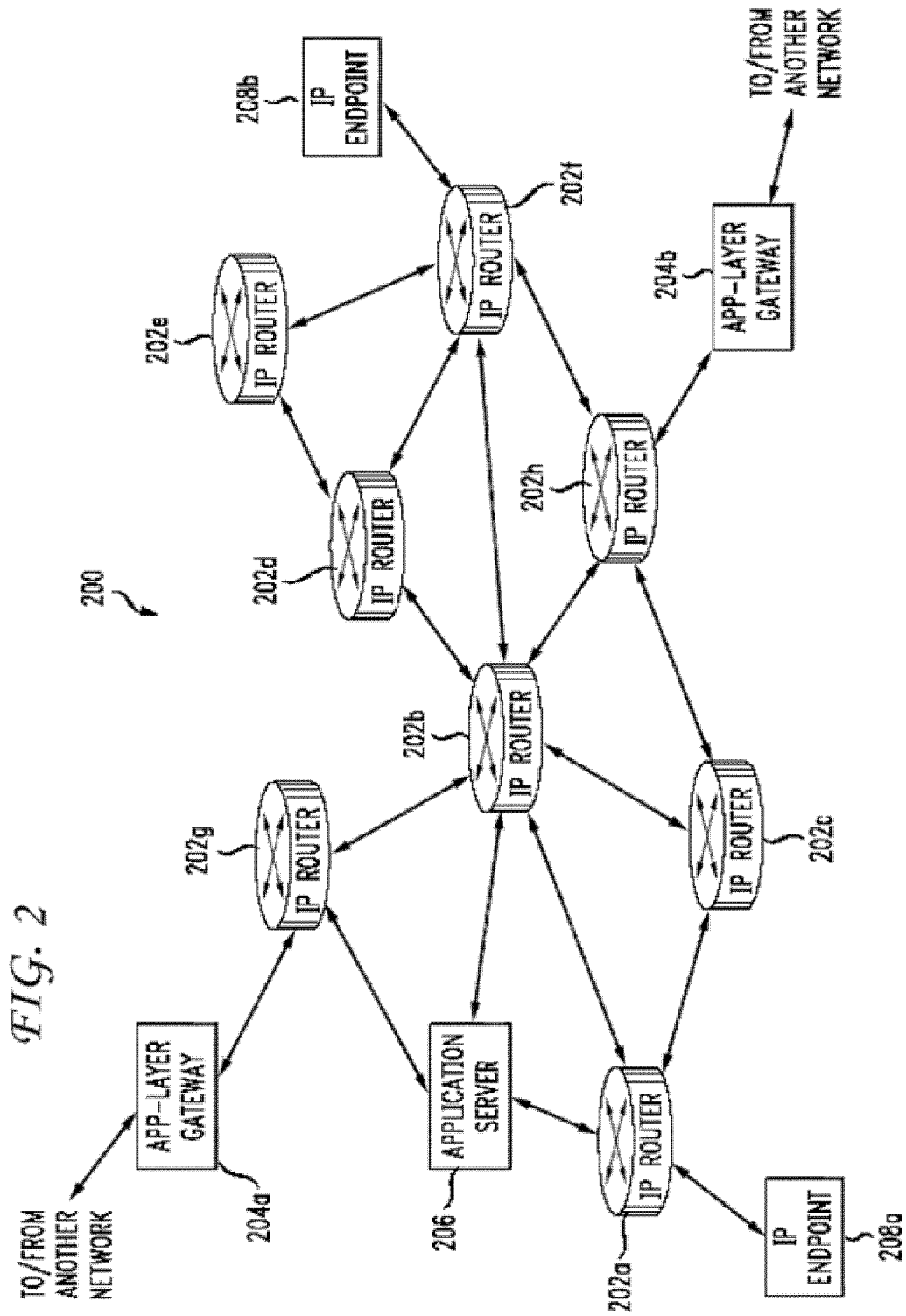
FIG. 2 illustrates an example network embodiment.

FIG. 2 illustrates an example telecommunications network embodiment 200. As shown in FIG. 2, telecommunications network 200 includes application-layer gateways 204a, 204b, an application server 206, Internet Protocol (IP) endpoints 208a, 208b, and various interconnected IP routers 202a-202h. This particular configuration of an IP-based network is illustrative. The telecommunications network is not limited to an IP-based network and is not limited to this particular configuration of application-layer gateways 204a, 204b, IP routers 202a-202h, etc.

Each IP router 202a-202h is a device that receives IP packets via one or more incoming network links and forwards the received packets along one or more outgoing network links. Typically IP routers 202a-202h maintain dynamic routing tables that enable the routers to alter the paths by which traffic is transmitted through the network 200. IP routers 202a-202h can reroute network traffic along different paths through the network 200 over time in response to various conditions such as link failures, congested routes, toll charges, and so forth. A data source such as an IP endpoint 208a, 208b or a network transmission mechanism such as an IP router 202a-202h can mark certain packets according to their contents. For example, audio traffic is marked as audio packets, video traffic is marked as video packets, and data traffic is marked as data packets.

Application-layer gateways 204a, 240b are data-processing systems that are capable of providing one or more application-layer functions such as Voice over IP (VoIP), FTP, streaming video, Internet Protocol Television (IPTV), remote desktop services, and so forth. Moreover, application-layer gateways 204a, 240b are also capable of participating in the performing of one or more of the tasks described below and with respect to FIGS. 3-12.

Application server 206 is a data-processing system that provides one or more services to support a particular application such as VoIP or IPTV, and is also capable of participating in the performing of one or more of the tasks described below and with respect to FIGS. 3-12. In accordance with one illustrative embodiment, application server 206 provides VoIP services such as call setup between two or more Internet Protocol endpoints 208a, 208b, call modification, call termination, etc. The application server 206 can provide services for other applications as well, including videoconferencing, IPTV, instead of or in addition to VoIP.

Each IP endpoint 208a, 208b is a device such as an IP telephone, an IP headset, an IP handset, an IP softphone, or an IP conference phone that communicates with other devices over the network 200 in accordance with the Internet Protocol (IP). Moreover, IP endpoints 208a, 208b can also perform one or more of the tasks described below.

Figure 3:
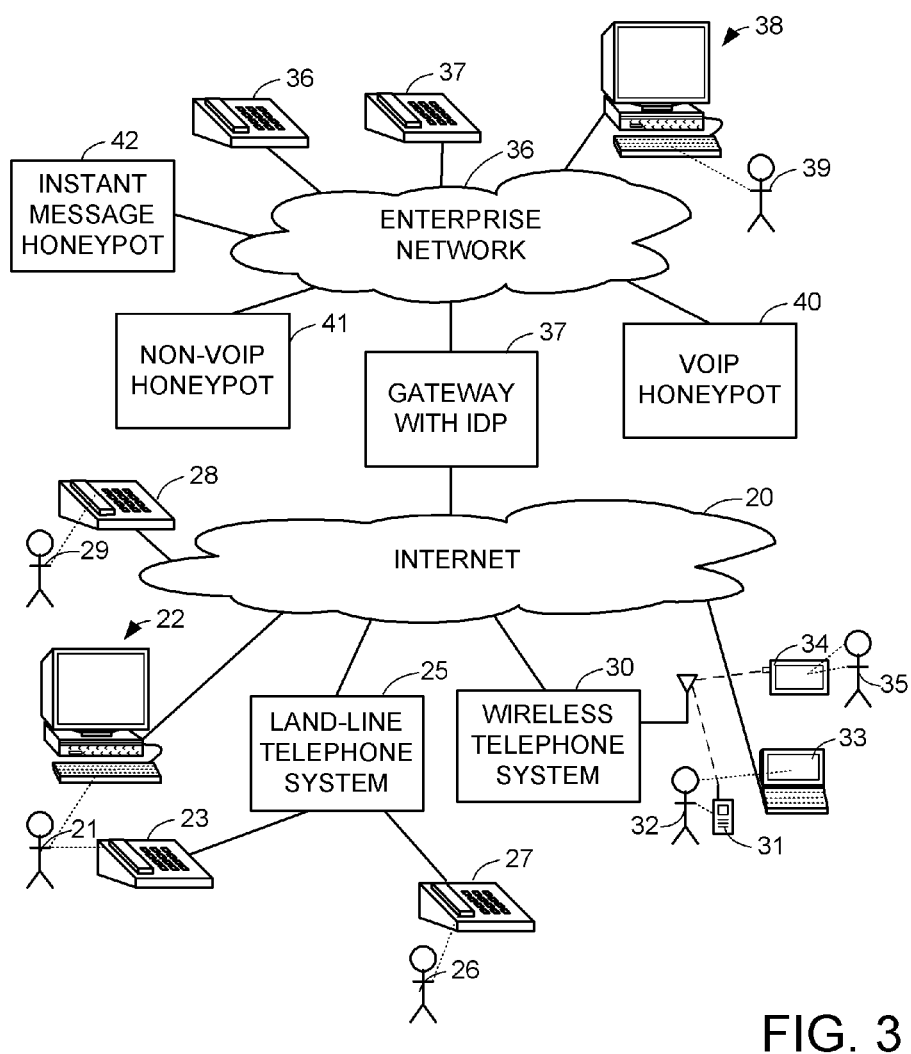
FIG. 3 illustrates an example Internet and enterprise network embodiment.

The disclosure now returns to a discussion of addressing cyber threats enabled by convergence of data and communication services in the system of FIG. 3. FIG. 3 shows the Internet 20 and various users, clients, and servers linked into the Internet. For example, a human user 21 operates a desktop personal computer 22 linked to the Internet 20. The user 21 also operates a desktop phone 23 in a land-line telephone system 25. Thus, the user 21 may call another human user 26 through the land-line telephone system to reach a desk-top phone 27 of the user 26.

The Internet 20 links the land-line telephone system 25 to VoIP phones, such as the VoIP phone 28 operated by a human user 29. The Internet 20 also links the land-line telephone system 25 to a wireless telephone system 30, so that calls can be placed to wireless devices such as a cell phone 31 of a human user 32. In this example, the user 32 has a laptop computer 33 linked to the Internet 20. The wireless telephone system 30 also provides data services, such text messages and e-mail and internet access, to smart phones and portable computing devices, such as a tablet computer 34 operated by a human user 35.

A medium or large size organization such as a corporation or government agency typically has an enterprise network 34 including desktop computers, such as the desktop computer 38 operated by a human user 39. The enterprise network 36 also has a gateway server 37 linking the enterprise network to the Internet 20 so that the desktop computer 38 may access the Internet 20 through the gateway server 37.

The enterprise network 36 also includes a number of VoIP phones 36, 37. In this case, the gateway server 37 may function as a Private Branch Exchange (PBX). For example, the PBX is reached at a main telephone number, and VoIP phones within the PBX are reached at respective extension numbers.

The gateway server 37 also has Intrusion Detection and Protection (IDP) software for blocking certain kinds of incoming traffic or incoming traffic marked as originating from certain "blacklisted" IP addresses. The gateway server 37 redirects suspicious VoIP traffic from the Internet 20 to a VoIP honeypot 40. The gateway server 37 redirects suspicious non-VoIP traffic from the Internet 20 to a non-VoIP honeypot 41. The non-VoIP honeypot forwards suspicious Instant Message (IM) traffic to an Instant Message honeypot 42. The honeypots 40, 41, 42 act as network decoys to contain and impede cyber attacks while the attacks are traced.

Figure 4:
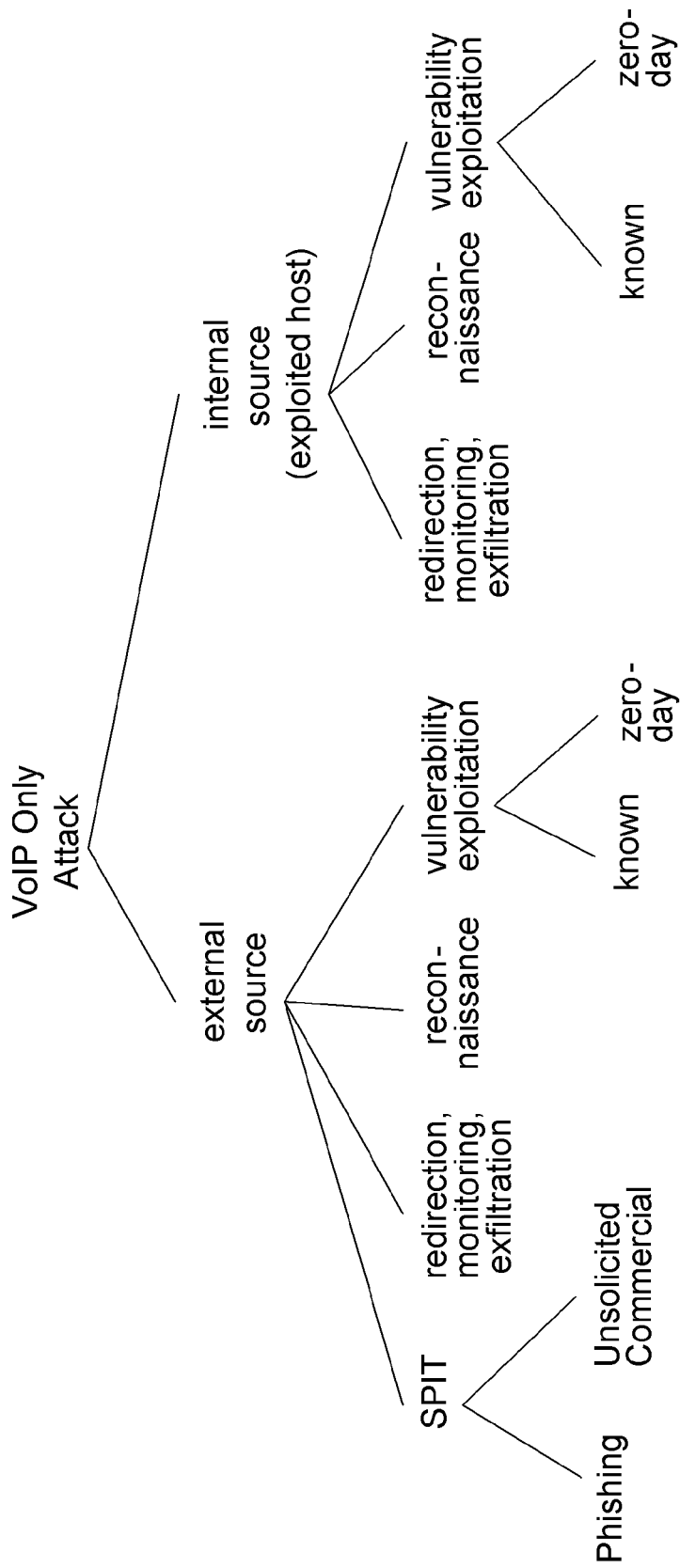
FIG. 4 illustrates classification of a VoIP-only cyber attack.

FIG. 4 shows a classification of VoIP only cyber attacks. The source of a VoIP only cyber attack is either external or internal with respect to the enterprise network. External VoIP only attacks originate from the Internet and include (1) unsolicited VoIP calls (known as Spam over IP Telephony, or SPIT); (2) redirection, monitoring, and exfiltration; (3) reconnaissance; and (4) vulnerability exploitation. SPIT is further classified as "phishing," which solicits sensitive information by impersonating a trusted source, and unsolicited commercial (UC). The vulnerability exploitation is further classified as either exploiting vulnerabilities known to the developers of the vulnerable software, or exploiting "zero-day" vulnerabilities that have been discovered by hackers but not yet known to the developers of the vulnerable software.

Internal source VoIP cyber attacks originate from an exploited host in the enterprise network. Typically the exploited host has been penetrated by an external non-VoIP cyber attack and infected with malicious code in a program or Hypertext Markup Language (HTML) document. The internal source VoIP cyber attacks are further classified as (1) redirection, monitoring, and exfiltration; (2) reconnaissance; and (3) vulnerability exploitation. The vulnerability exploitation may exploit either known vulnerabilities or "zero day" vulnerabilities.

Figure 5:
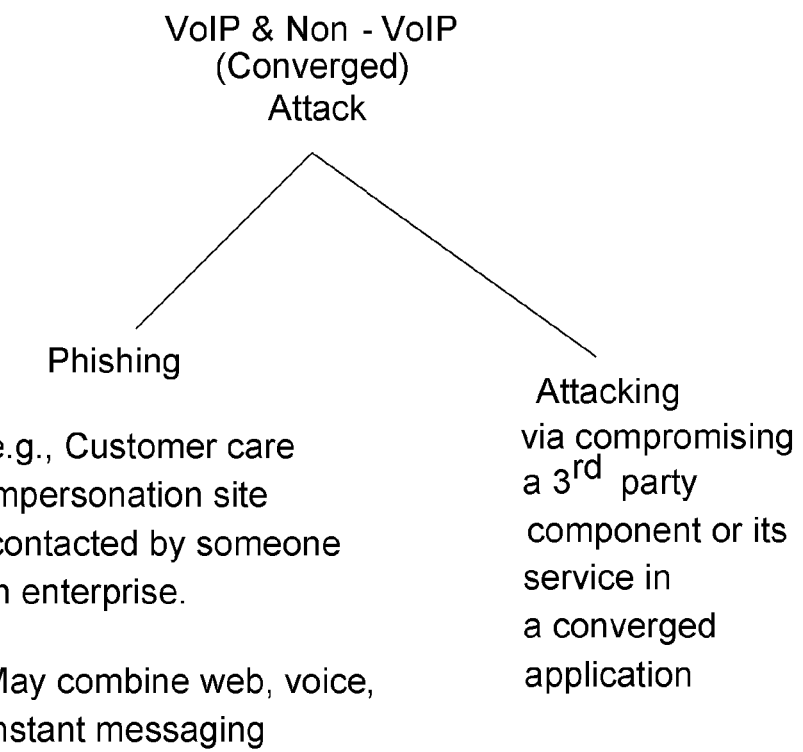
FIG. 5 illustrates classification of a VoIP and Non-VoIP converged cyber attack.

FIG. 5 shows a classification of VoIP and non-VoIP converged cyber attacks. Such cyber attacks involve converged applications combining VoIP with web or instant messaging (IM) service. These cyber attacks involving converged applications are further classified as phishing attacks that impersonate a trusted source to solicit sensitive information, and attacks that do not impersonate a trusted source yet compromise a third party component or its service in a converged application.

Figure 6:
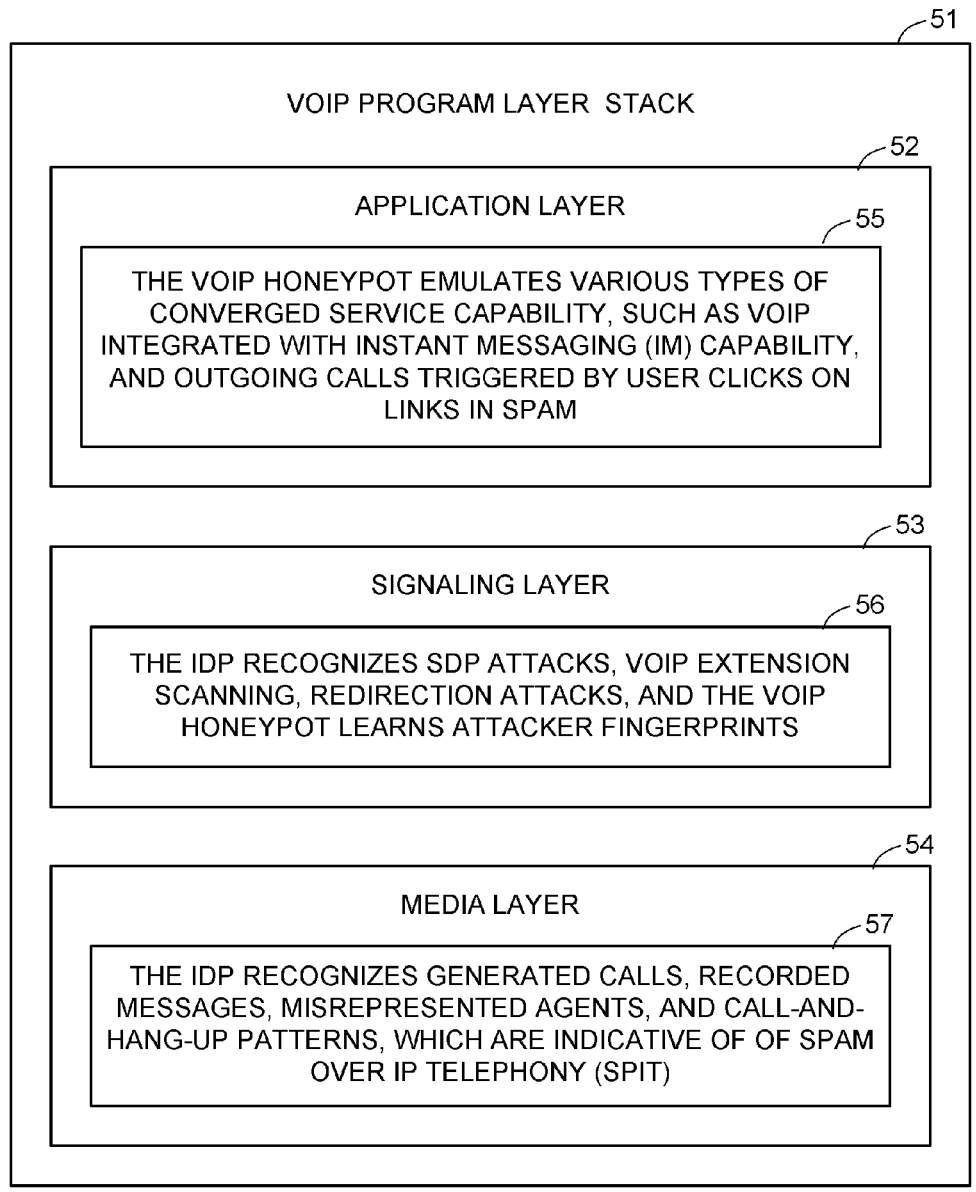
FIG. 6 illustrates the handling of VoIP cyber attacks at respective program layers of the VoIP stack.

FIG. 6 illustrates the handling of VoIP cyber attacks at respective program layers of the VoIP stack 51. The VoIP stack 51 includes a top-level application layer 52, a mid-level signaling layer 53, and a bottom-level media layer 54. In the application layer 51, the VoIP honeypot includes programs 55 for emulating various types of converged service capability, such as VoIP integrated with instance messaging (IM) capability, and outgoing calls triggered by user clicks on links in unsolicited electronic mail, commonly known as SPAM. Programming 56 in the signaling layer 53 enables the intrusion detection and protection (IDP) in the gateway server (37 in FIG. 3) to recognize session description protocol (SDP) attacks, VoIP extension scanning, and redirection attacks, and the VoIP honeypot learns attacker fingerprints. The session description protocol (SDP) attacks, VoIP extension scanning, and redirection attacks, can also be recognized by other signaling elements in the enterprise network. Programming 57 in the media layer 54 enables the intrusion detection and protection (IDP) in the gateway server (37 in FIG. 3) to recognize generated calls, recorded messages, misrepresented agents, and call-and-hang-up patterns, which are indicative of SPAM over IP Telephony (SPIT). The generated calls, recorded messages, misrepresented agents, and call-and-hang-up patterns, can also be recognized by other media elements in the enterprise network.

Figure 7:
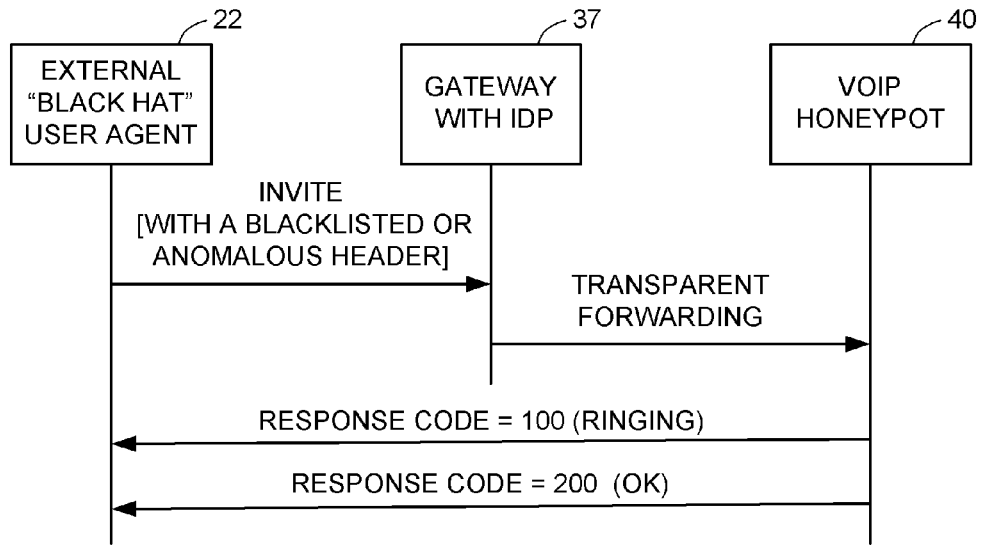
FIG. 7 illustrates a signaling scenario in which a gateway server with Intrusion Detection and Protection (IDP) forwards an incoming INVITE request to the VoIP honeypot.

FIG. 7 illustrates a signaling scenario in which the gateway 37 with IDP forwards an incoming INVITE request to the VoIP honeypot 40. The signaling scenario begins with an external "black hat" user agent 22 (i.e., a malicious agent in the Internet outside of the enterprise network) sending the INVITE message to the gateway server 37. The IDP software in the gateway server 37 recognizes that the INVITE message has a blacklisted or anomalous header so that the gateway server 37 transparently forwards the INVITE message to the VoIP honeypot 40. The VoIP honeypot 40 completes the call session setup by returning a response code of 100, indicating ringing, to the external "black hat" user agent 22, and after a few seconds, the VoIP honeypot 40 also returns a response code of 200, indicating that the user agent has answered the call. The VoIP honeypot then conducts a telephone conversation with the "black hat" user agent 22 in a fashion that impersonates the behavior of a human agent.

For example, the VoIP honeypot automatically answers with a voice response of "hello" followed by a pause, and then waits for a voice response from the "black hat" user agent 22. The VoIP honeypot also terminates a call when appropriate, for example, by saying "good by" and then hanging up, or by saying "if you having anything more to say, please leave a message in my voice mail box" and then transferring the call to a voice mail box. The VoIP honeypot also automatically responds to a request to enter a number for obtaining further information, so that the honeypot enters the number and the call is continued, possibly with a human user of the external "black hat" user agent 22.

When appropriate, the VoIP honeypot will answer by functioning as automatic voice mail system instead of impersonating a human user. For the case where the "black hat" user agent has dialed a phone number assigned to a virtual user agent of the honeypot, a human name and an occupancy schedule is established for a virtual user of the virtual user agent, and if the occupancy schedule indicates that the virtual user is absent, then the call to the virtual user agent is answered by the honeypot automatic voice mail system. The VoIP honeypot may also direct a call to the honeypot automatic voice mail system when the VoIP honeypot detects that VoIP honeypot is conversing with a human user of the external "black hat" user agent.

Figure 8:
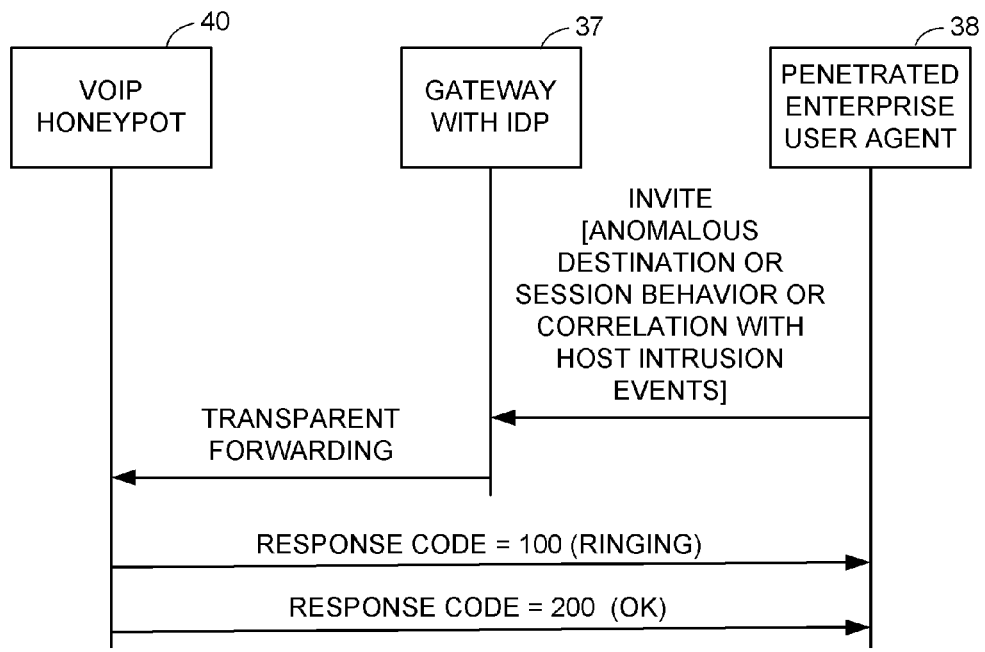
FIG. 8 illustrates a signaling scenario in which a gateway server with Intrusion Detection and Protection (IDP) forwards an outgoing INVITE request from a penetrated enterprise user agent to the VoIP honeypot.

FIG. 8 illustrates a signaling scenario in which the gateway 37 with IDP forwards an outgoing INVITE request from a penetrated enterprise user agent 38 to the VoIP honeypot 40. For example, the penetrated user agent 38 is penetrated upon receipt of a malicious HTML web page from the Internet, and the INVITE is produced when a human user clicks on a link in the HTML web page. The IDP in the gateway 37 detects that the INVITE has an anomalous destination or anomalous session behavior or an anomalous correlation with host intrusion events, and in response, the gateway 37 transparently forwards the INVITE request to the VoIP honeypot 40. The VoIP honeypot 40 completes the call session setup by returning a response code of 100, indicating ringing, to the penetrated enterprise user agent 38, and after a few seconds, the VoIP honeypot 40 also returns a response code of 200, indicating that the user agent has answered the call. The VoIP honeypot then conducts a telephone conversation with the penetrated enterprise user agent 38 in a fashion that impersonates the behavior of a human agent.

Figure 9:
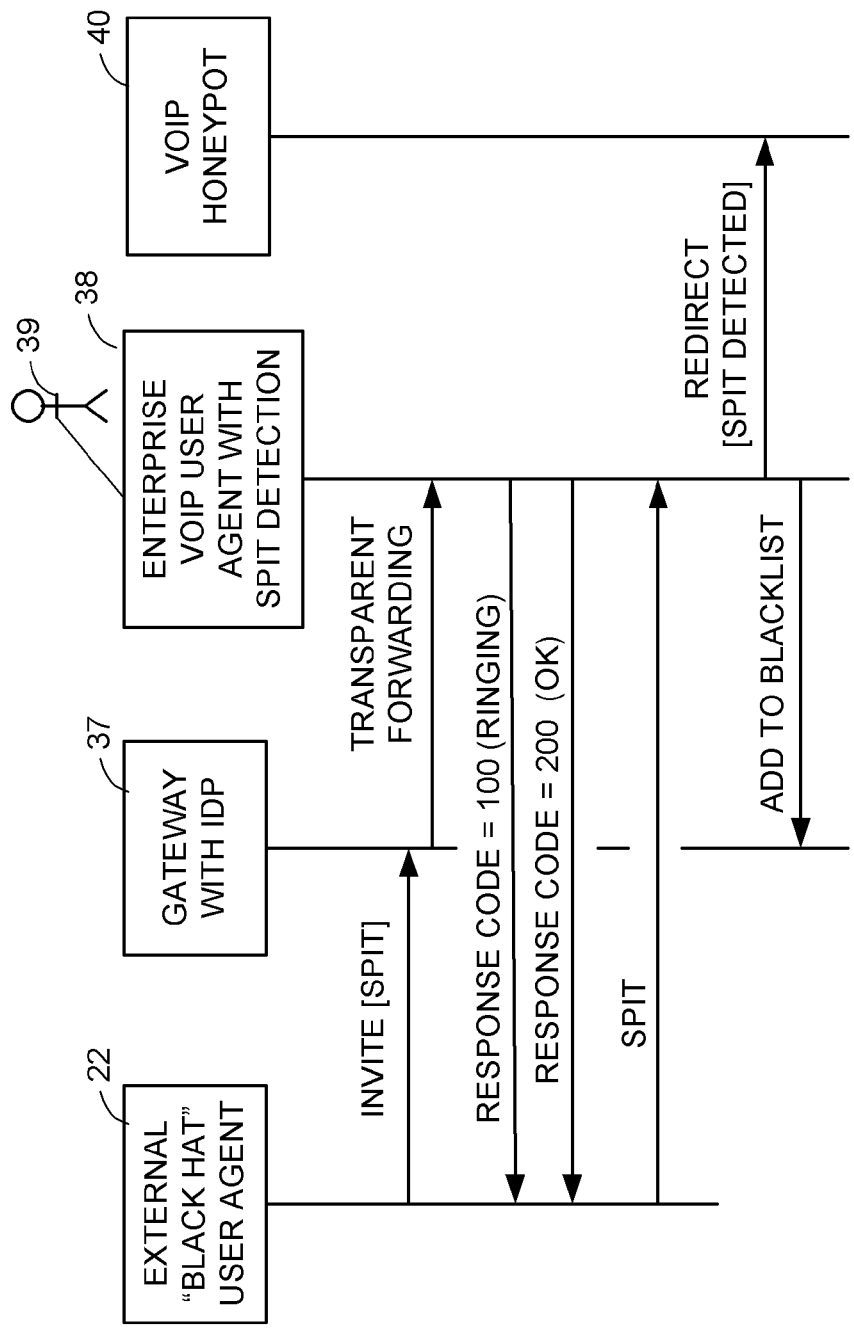
FIG. 9 illustrates a signaling scenario in which an unsolicited VoIP call (i.e., SPIT) is detected at an enterprise VoIP user agent and the VoIP call is redirected to the VoIP honeypot.

FIG. 9 illustrates a signaling scenario in which an unsolicited VoIP call (i.e., SPIT) is detected at an enterprise VoIP user agent 38 and the VoIP call is redirected to the VoIP honeypot 40. The SPIT can be detected automatically by a program in the enterprise VoIP user agent 38, or the SPIT can be redirected when a human user 39 of the enterprise VoIP user agent decides that the VoIP call is SPIT and activates a "transfer SPIT" button on the enterprise VOIP user agent 38.

In FIG. 9, the SPIT originates from an external "black hat" user agent 22, which sends an INVITE request to the gateway 37. The gateway 37 transparently forwards the INVITE request to the enterprise VoIP user agent 38. The enterprise user agent 38 completes setup of the call session by returning a response code of 100, indicating ringing, to the external "black hat" user agent, and after a few seconds, the enterprise VoIP user agent 38 also returns a response code of 200, indicating that the user agent has answered the call. The external "black hat" user agent 22 then sends SPIT to the enterprise VoIP user agent 38. Once the enterprise user agent 38 detects that the VoIP call is SPIT, the enterprise user agent 38 transparently redirects the VoIP call to the VoIP honeypot 40. The VoIP honeypot 40 then continues the VoIP call by automatically impersonating a conversation with a human user. The enterprise user agent 38 also sends a request to the gateway 37 to add the SPIT to a blacklist used by the IDP software of the gateway. If the human user 39 of the enterprise user agent has confirmed that he VoIP call is SPIT, this fact is also sent to the gateway 37 and noted in the blacklist.

Figure 10:
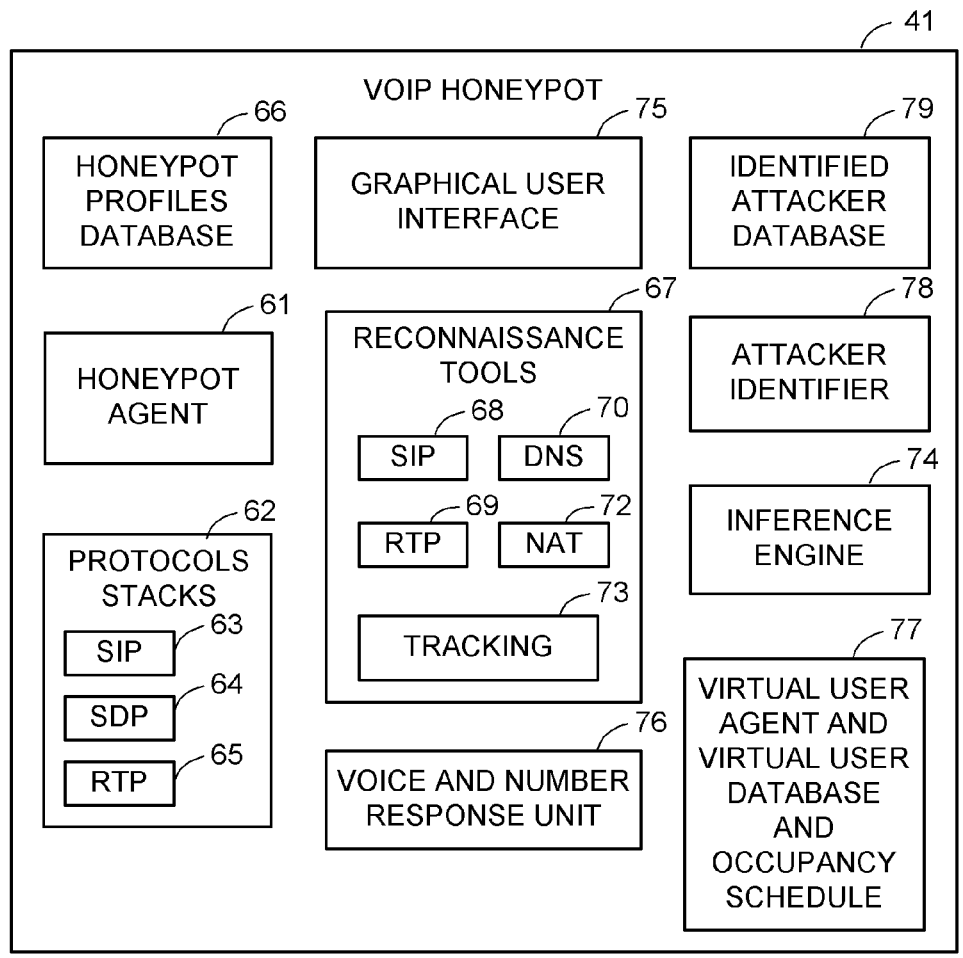
FIG. 10 illustrates components of the VoIP honeypot.

FIG. 10 illustrates components of the VoIP honeypot 41. These components include (1) a honey-pot agent 61 responsible for accepting incoming calls and investigating possible attacks, (2) protocol stacks 62 for SIP 63, SDP 64, and the Real-time Transfer Protocol (RTP) 65, (3) a honeypot profiles database 66 of configuration files, (4) reconnaissance tools 67, and (5) an inference engine 74 able to interpret automatically the results of investigations by means of special metrics and a Bayes model. The reconnaissance tools include tools that check the received message for exploitation of VoIP and network protocols such as SIP 68, RTP 69, Dynamic Name Service (DNS) 70, and Network Address Translation (NAT) 72. The reconnaissance tools also include a program 73 for tracking the cyber attacks.

The tracking 73, in combination with the inferences of the inference engine 74, are used by an attacker identifier 78 to group attacks that appear to originate from the same source due to the tracking or common characteristics of the attacks. The attacker identifier 78 looks for a history of SPIT behavior from endpoint user agents, looks for extension scanning behavior indicative of SPIT distribution, and correlates different external IP source addresses by geographic mapping of the source addresses to a common geographic location, The attacker identifier 78 compiles a fingerprint of the attacker for each group of attacks that appear to originate from the same source, and stores the attacker fingerprints in an identified attacker database 79.

The VoIP honeypot 41 further includes a voice and number response unit 76 capable of voice recognition and capable of responding to SPIT by conducting a voice conversation that impersonates a human user and that responds to requests to touch a number on a touch-tone phone keypad for further information by touching the number so that a VoIP call session is continued. The VoIP honey pot 41 also has a virtual user agent and virtual user database and occupancy schedule 77, permitting the VoIP honeypot to direct VoIP calls to a respective voice mail box in an automatic voice mail system when the occupancy schedule indicates that a virtual user is absent. The honeypot also has a graphical user interface 75 to allow a system administrator to choose and setup a honeypot profile, as well as visualize traces, alerts, and statistics.

Figure 11:
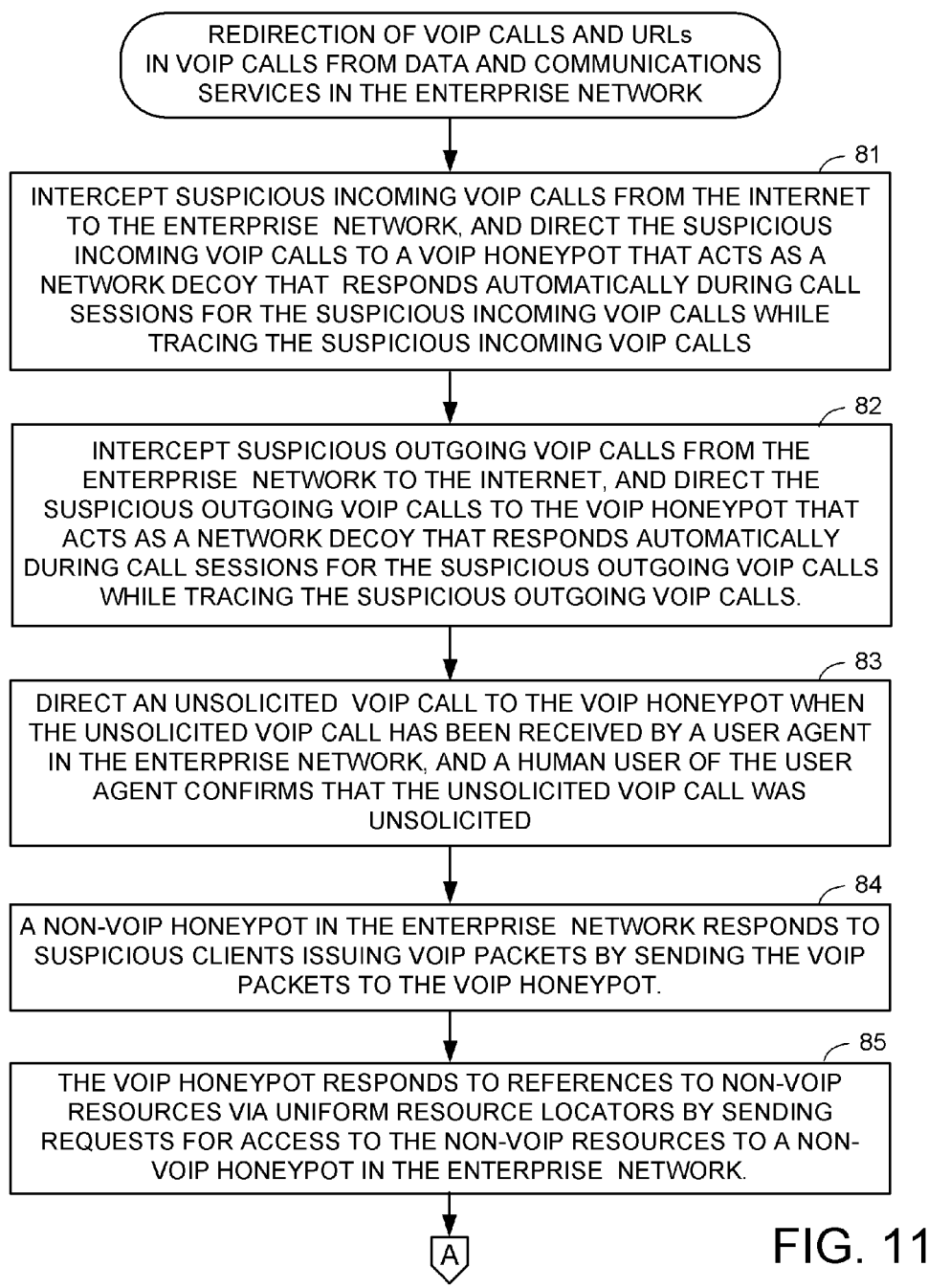
FIGS. 11 and 12 together illustrate a flowchart of a preferred method of redirection of VoIP calls and Uniform Resource Locators (URLs) in VoIP calls from data and communications services in the enterprise network in FIG. 3.
Figure 12:
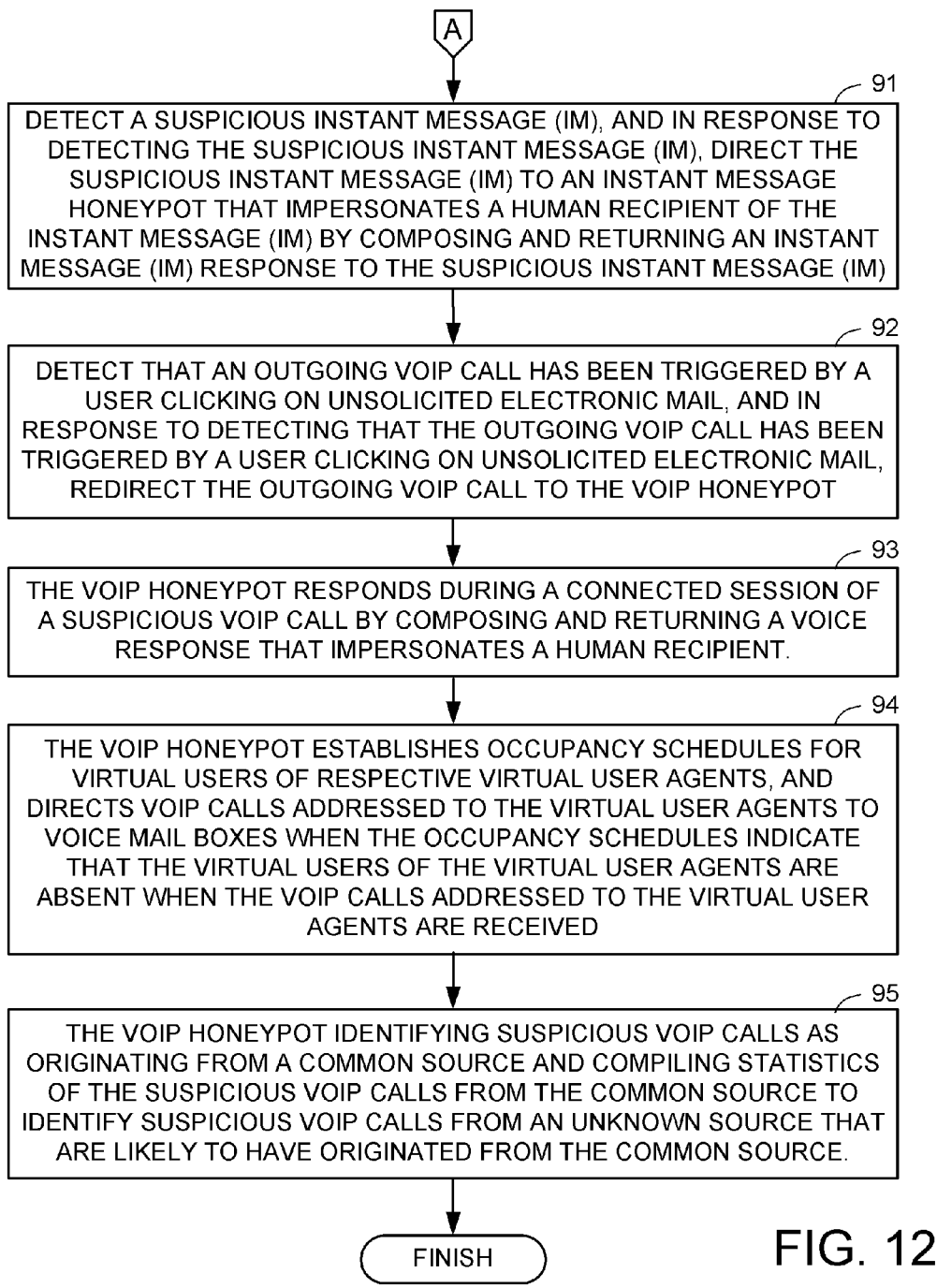

FIGS. 11 and 12 together illustrate a flowchart of a preferred method of redirection of VoIP calls and Uniform Resource Locators (URLs) in VoIP calls from data and communications services in the enterprise network in FIG. 3. In a first step 81, suspicious incoming VoIP calls from the Internet to the enterprise network are intercepted and directed to the VoIP honeypot that acts as a network decoy and that responds automatically during call sessions for the suspicious incoming VoIP calls while tracing the suspicious incoming VoIP calls.

In step 82, suspicious outgoing VoIP calls from the enterprise network to the Internet are intercepted and directed to the VoIP honeypot that acts as a network decoy and that responds automatically during call sessions for the suspicious outgoing VoIP calls while tracing the suspicious outgoing VoIP calls.

In step 83, an unsolicited VoIP call is directed to the VoIP honeypot when the unsolicited VoIP call has been received by a user agent in the enterprise network and a human user of the user agent confirms that the unsolicited call was unsolicited.

In step 84, a non-VoIP honeypot in the enterprise network responds to suspicious client issuing VoIP packets by sending the VoIP packets to the VoIP honeypot. In step 85, the VoIP honeypot responds to references to non-VoIP resources via Uniform Resource Locators (URLs) by sending requests for access to the non-VoIP resources to a non-VoIP honeypot in the enterprise network.

In step 91 in FIG. 12, a suspicious instant message (IM) is detected, and in response to detecting the suspicious instant message (IM), the suspicious instant message (IM) is directed to the instant message honeypot (42 in FIG. 3) that impersonates a human recipient of the instant message (IM) by composing and returning an instant message (IM) response to the suspicious instant message (IM). The instant message (IM) response, for example, is composed by a rule-based expert system in the instant message honeypot.

In step 92, in response to detecting that an outgoing VoIP call has been triggered by a user clicking on unsolicited electronic mail, the outgoing VoIP call is redirected to the VoIP honeypot.

In step 93, the VoIP honeypot responds during a connected session of a suspicious VoIP call by composing and returning a voice response that impersonates a human recipient.

In step 94, the VoIP honeypot establishes occupancy schedules for virtual users of respective virtual user agents, and directs VoIP calls addressed to the virtual user agents to voice mail boxes when the occupancy schedules for the virtual users indicate that the virtual users of the virtual user agents are absent when the VoIP calls addressed to the virtual user agents are received.

In step 95, the VoIP honeypot identifies suspicious VoIP calls as originating from a common source and compiles statistics of the suspicious VoIP calls from the common source to identify suspicious VoIP calls from an unknown source that are likely to have originated from the common source. For example, once a "fingerprint" of characteristic VoIP call statistics is established for suspicious VoIP calls from the common source, this fingerprint can be used to identify suspicious VoIP calls from other sources or from unknown sources as originating from the common source. In this fashion, the most threatening cyber attackers can be traced, identified, and prosecuted once sufficient evidence of illicit activity has been gathered.

The system and method as described above for addressing cyber threats against converged data and communication services coordinates VoIP and non-VoIP honeypots to provide consistency of ports, state, and data between VoIP and non-VoIP resources in the different honeypots. There is transparent handoff to the honeypots and transparent handoff between the different kinds of honeypots. There is consistent analysis across the different types of honeypots.

The honeypots provide increased realism to enhance the value of the honeypots because the attacker spends more time in meaningless reconnaissance. The realism is increased by use of appropriate protocol fingerprints, by incorporating the back-to-back user agent (B2BUA) function for intermediating suspicious flows (e.g., during gateway redirection of VoIP calls to the VoIP honeypot), by using automated voice response for connected sessions with the VoIP honeypot, and by automatic simulation of IM conversations. The appropriate protocol fingerprints include the correct vendor specific protocol headers and other identifying patterns, and the VoIP honeypot is configured to use these protocol fingerprints.

Redirection to the VoIP honeypot is controlled to avoid false positives that could adversely affect legitimate end users. The goal is to distinguish SPIT from accidental wrong number calls and intermittent phone connections, and to distinguish phishing SPIT from unsolicited commercial SPIT. Techniques for avoiding false positives include looking for a history of SPIT behavior from endpoint user agent, looking for extension scanning behavior indicative of SPIT distribution, correlating different external IP source addresses by geographic mapping of the source addresses to a common geographic location, and allowing the end user to confirm that a received call is SPIT.

The VOIP honeypot can act as an endpoint, mediator, or signaling element in various configurations providing converged services. The converged VoIP honeypot can act as endpoint or mediator, for example, via a Back-to-Back User Agent (B2BUA) configuration in the honeypot or elsewhere in the call signaling path. The converged VoIP honeypot can act as an endpoint or signaling element in forked legs of a call path, or in redirected call paths. The converged VoIP honeypot can act as an endpoint or signaling element in call topologies which include lawful intercept, bridging, multi-point calls, conference calls, call backs, and call recording. The converged VoIP honeypot can act as an endpoint or signaling element in call sessions where third-party call control is used. The converged VoIP honeypot also can act as an endpoint or signaling in call topologies which use one or more feature servers.

The converged VoIP honeypot can act as an endpoint or mediator for calls which have video or other streaming media, have video servers as sources of media presented either in the call media path or out-of-band, for example via an Internet Protocol television (IPTV) service or web-service presented to the call parties.

The converged VoIP honeypot also can act as an endpoint or mediator for sessions which include web conferencing. The converged VoIP honeypot can either emulate the web conferencing endpoint or coordinate with a specific external honeypot or service to provide the emulation.

The converged VoIP honeypot can act as an endpoint, signaling element, routing element, and/or media element for call sessions using a peer-to-peer or overlay network, or in hybrid sessions where portions of the call path are signaled via servers and gateways and other portions are signaled via overlay. Additionally, some session media may be carried via client server and other session media may be carried via an overlay or torrrent.

Converged data and communication services can use in-band and out-of-band transport. The converged VoIP honeypot can act as an endpoint, signaling element, or otherwise participate in converged services scenarios which combine streaming media, web services, http application connections, bi-directional http connections, instant messaging, SMS, IPTV, sensor networks and feeds, and torrents, and the converged VoIP honeypot will coordinate each session component, either internally or with specialized honeypot elements or services or agents, to provide consistency between session components and realism to the attacker. The converged VoIP honeypot can implement virtual call forwarding in which a call to one virtual agent is forwarded to another virtual agent. The converged VoIP honeypot also can act as an endpoint or signaling element in sessions carried over bi-directional http or web services such as the Web Service Initiation Protocol (WSIP).

Honeypots at different enterprise networks can also be coordinated to exchange information about suspicious calls, and thereby form a honey net. As new VoIP attacks are detected at various enterprise networks in the honey net, the attacker fingerprints and identifications are updated at a central database, and downloaded to all the enterprise networks in the honey net. New enterprise networks would obtain the attacker fingerprints and identifications on a subscription basis.

Embodiments within the scope of the present disclosure may also include tangible and/or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A method comprising:
   establishing, at a voice over Internet protocol (VoIP) honeypot in a network, an occupancy schedule for a virtual user agent associated with the VoIP honeypot the VoIP honeypot acting as a decoy;
   intercepting an unsolicited incoming VoIP call to the network when the unsolicited incoming VoIP call is addressed to the virtual user agent;
   directing the unsolicited incoming VoIP call to a voice mailbox associated with the VoIP honeypot when the occupancy schedule indicates that the virtual user agent is unavailable when the unsolicited incoming VoIP call is received; and
   responding, at the VoIP honeypot, to the unsolicited incoming VoIP call during a call session while tracing the unsolicited incoming VoIP call.

2. The method of claim 1, wherein the unsolicited incoming VoIP call is directed to the voice mailbox when a human user confirms that the unsolicited incoming VoIP call is unsolicited.

3. The method of claim 1, further comprising responding, at a non-VoIP honeypot in the network, to a client sending a VoIP packet to the VoIP honeypot.

4. The method of claim 1, further comprising responding, at the VoIP honeypot, to a reference to a non-VoIP resource by sending a request, to a non-VoIP honeypot in the network, for access to the non-VoIP resource.

5. The method of claim 1, further comprising:
   detecting an unsolicited instant message; and
   directing the unsolicited instant message to an instant message honeypot that impersonates a human recipient of the instant message by composing and sending an instant message response to the instant message.

6. The method of claim 1, further comprising detecting that an outgoing VoIP call has been triggered by a user accessing a link contained in an unsolicited email, and directing the outgoing VoIP call to the VoIP honeypot.

7. The method of claim 1, wherein responding to the unsolicited incoming VoIP call comprises composing and returning a voice response that impersonates a human recipient.

8. The method of claim 1, further comprising identifying suspicious calls as originating from a common source of unsolicited calls, and compiling statistics of the suspicious calls to identify a call from an unknown source as being likely to have originated from the common source.

9. A system comprising:
   a processor; and
   a computer-readable storage medium storing instructions which, when executed by the processor, cause the processor to perform operations comprising:
      establishing, at a voice over Internet protocol (VoIP) honeypot in a network, an occupancy schedule for a virtual user agent associated with the VoIP honeypot, the VoIP honeypot acting as a decoy;
      intercepting an unsolicited incoming VoIP call to the network when the unsolicited incoming VoIP call is addressed to the virtual user agent;
      directing the unsolicited incoming VoIP call to a voice mailbox associated with the VoIP honeypot when the occupancy schedule indicates that the virtual user agent is unavailable when the unsolicited incoming VoIP call is received; and
      responding, at the VoIP honeypot, to the unsolicited incoming VoIP call during a call session while tracing the unsolicited incoming VoIP call.

10. The system of claim 9, wherein the unsolicited incoming VoIP call is directed to the voice mailbox when a human user confirms that the unsolicited incoming VoIP call is unsolicited.

11. The system of claim 9, wherein the computer-readable storage medium stores additional instructions which, when executed by the processor, cause the processor to perform further operations comprising responding, at a non-VoIP honeypot in the network, to a client sending a VoIP packet to the VoIP honeypot.

12. The system of claim 9, wherein the computer-readable storage medium stores additional instructions which, when executed by the processor, cause the processor to perform further operations comprising responding, at the honeypot, to a reference to a non-VoIP resource by sending a request, to a non-VoIP honeypot in the network, for access to the non-VoIP resource.

13. The system of claim 9, wherein the computer-readable storage medium stores additional instructions which, when executed by the processor, cause the processor to perform further operations comprising:
   detecting an unsolicited instant message; and
   directing the unsolicited instant message to an instant message honeypot that impersonates a human recipient of the instant message by composing and sending an instant message response to the instant message.

14. The system of claim 9, wherein the computer-readable storage medium stores additional instructions which, when executed by the processor, cause the processor to perform further operations comprising detecting that an outgoing VoIP call has been triggered by a user accessing a link contained in an unsolicited email, and directing the outgoing VoIP call to the VoIP honeypot.

15. The system of claim 9, wherein responding to the unsolicited incoming VoIP call comprises composing and sending a voice response that impersonates a human recipient.

16. The system of claim 9, wherein the computer-readable storage medium stores additional instructions which, when executed by the processor, cause the processor to perform further operations comprising identifying suspicious calls as originating from a common source of unsolicited calls, and compiling statistics of the suspicious calls to identify a call from an unknown source as being likely to have originated from the common source.

17. A computer-readable storage device storing instructions which, when executed by a processor, cause the processor to perform operations comprising:
   establishing, at a voice over Internet protocol (VoIP) honeypot in a network, an occupancy schedule for a virtual user agent associated with the VoIP honeypot the VoIP honeypot acting as a decoy;
   intercepting an unsolicited incoming VoIP call to the network when the unsolicited incoming VoIP call is addressed to the virtual user agent;
   directing the unsolicited incoming VoIP call to a voice mailbox associated with the VoIP honeypot when the occupancy schedule indicates that the virtual user agent is unavailable when the unsolicited incoming VoIP call is received; and
   responding, at the VoIP honeypot, to the unsolicited incoming VoIP call during a call session while tracing the unsolicited incoming VoIP call.

18. The computer-readable storage device of claim 17, wherein the unsolicited incoming VoIP call is directed to the voice mailbox when a human user confirms that the unsolicited incoming VoIP call is unsolicited.

* * * * *